(12) United States Patent
Schaefer et al.

(10) Patent No.: US 11,290,490 B2
(45) Date of Patent: Mar. 29, 2022

(54) CLOUD SERVICE SECURITY MANAGEMENT

(71) Applicant: Nokia Technologies Oy, Espoo (FI)

(72) Inventors: Manfred Schaefer, Forstinning (DE); Iris Adam, Munich (DE); Stephane Mahieu, Munich (DE); Jing Ping, Chengdu (CN)

(73) Assignee: Nokia Technologies Oy, Espoo (FI)

( * ) Notice: Subject to any disclaimer, the term of this patent is extended or adjusted under 35 U.S.C. 154(b) by 322 days.

(21) Appl. No.: 16/340,793

(22) PCT Filed: Oct. 12, 2016

(86) PCT No.: PCT/CN2016/101916
§ 371 (c)(1),
(2) Date: Apr. 10, 2019

(87) PCT Pub. No.: WO2018/068234
PCT Pub. Date: Apr. 19, 2018

(65) Prior Publication Data
US 2020/0128046 A1 Apr. 23, 2020

(51) Int. Cl.
*H04L 29/06* (2006.01)
*G06F 9/50* (2006.01)

(52) U.S. Cl.
CPC ............ *H04L 63/20* (2013.01); *G06F 9/5077* (2013.01); *H04L 63/0876* (2013.01); *H04L 63/102* (2013.01)

(58) Field of Classification Search
CPC ... H04L 63/20; H04L 63/0876; H04L 63/102; H04L 63/0272; H04L 63/0823; G06F 9/5077; G06F 21/604
See application file for complete search history.

(56) References Cited

U.S. PATENT DOCUMENTS

| 9,104,672 | B2 * | 8/2015 | Beaty | ................. G06F 11/3409 |
| 2006/0010445 | A1 | 1/2006 | Peterson et al. | |

(Continued)

OTHER PUBLICATIONS

Extended European Search Report received for corresponding European Patent Application No. 16918814.1, dated Apr. 28, 2020, 9 pages.

(Continued)

*Primary Examiner* — Khoi V Le
(74) *Attorney, Agent, or Firm* — Harrington & Smith

(57) ABSTRACT

Cloud service security management in cloud computer environment uses a first computer cloud entity with first security capabilities and under security management coordinated by a first security management service point in compliance with predefined first security requirements. Security management of a second computer cloud entity is coordinated by a second security management service point in compliance with predefined second security requirements. In the managing of the security of the cloud service in the cloud computer environment: a trusted relationship is established between the first and second security management service points, general security requirements for the cloud service are obtained; and a first security policy is defined for the first security management service point, based on the general security requirements for the cloud service, the first security capabilities and the first security requirements, for the running of the cloud service by the first computer cloud entity.

19 Claims, 6 Drawing Sheets

(56) References Cited

U.S. PATENT DOCUMENTS

| | | | | |
|---|---|---|---|---|
| 2009/0178132 A1* | 7/2009 | Hudis | ................ | G06Q 30/0204 |
| | | | | 726/12 |
| 2010/0251328 A1* | 9/2010 | Syed | ...................... | H04L 63/20 |
| | | | | 726/1 |
| 2011/0131275 A1 | 6/2011 | Maida-Smith et al. | | |
| 2013/0311778 A1* | 11/2013 | Cherukuri | ........... | H04L 63/0272 |
| | | | | 713/171 |
| 2015/0188949 A1* | 7/2015 | Mahaffey | .............. | H04W 12/37 |
| | | | | 726/1 |

OTHER PUBLICATIONS

"Network Functions Virtualisation (NFV); Management and Orchestration", ETSI GS NFV-MAN 001, V1.1.1, Dec. 2014, pp. 1-184.
"Use Cases and Functional Requirements for Inter-Cloud Computing", GICTF White Paper, Aug. 9, 2010, 44 pages.
Motohashi, "Global Inter-Cloud Technology Forum (GICTF)", NTT Data Agilenet L.L.C., May 18, 2011, 30 pages.
International Search Report and Written Opinion received for corresponding Patent Cooperation Treaty Application No. PCT/CN2016/101916, dated Jul. 11, 2017, 12 pages.

\* cited by examiner

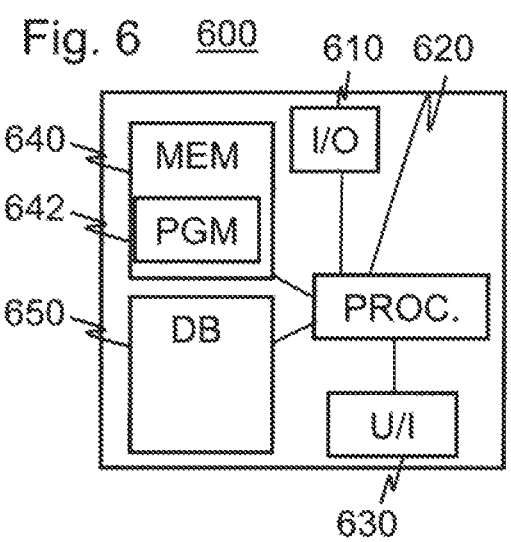

CLOUD SERVICE SECURITY MANAGEMENT

RELATED APPLICATION

This application was originally filed as PCT Application No. PCT/CN2016/101916 filed Oct. 12, 2016.

TECHNICAL FIELD

The present application generally relates to cloud service security management.

BACKGROUND

This section illustrates useful background information without admission of any technique described herein representative of the state of the art.

Cloud computing is a technique that provides a cost-efficient platform for running computer services. Dedicated servers required dimensioning of the computation capacity for the peak demand so that most of the time, the servers would be running at low workload. Cloud computing dynamically shares and distributes computing work among pooled computers. Cloud computing is also capable of rendering the computing near the service users thus reducing delays caused by intercontinental communications.

Cloud computing is a cost-efficient technique thanks to its dynamic or adaptive sharing of resources, but unfortunately also somewhat harder to control than dedicated servers. A dedicated server running only one service can easily be tailored in terms of service level and security as desired. Quite conversely, a service run in a cloud is performed by numerous different computers in one or more locations and the equipment and configuration of such systems may greatly vary. Particular security problems arise already from the shift from uniquely identifiable hardware that enables easy encapsulating of sensitive data and code to virtualized and/or moveable software applications. The virtualized software applications are easier to copy/modify/move, but they have to rely on the security and isolation capabilities of the underlying virtualization system, e.g. underlying hypervisors and platforms. Still further, some clouds span over numerous countries and continents so that the implementation varies not only for technical reasons but potentially also for regulative reasons such as obligatory requirements of lawful interception or privacy protection regulations that may mandate particular cryptographic measures that might be undesirable elsewhere due to their computational cost.

While managing the service implementation within a cloud may be challenging, a single service might be implemented using plural clouds and/or within plural administrative domains within a single cloud. On the other hand, one cloud typically runs numerous different services each of which may greatly vary by its demands and must be isolated from other services. This isolation requirement is one typical but major security requirement. Particular challenges for security management may be caused by variability of security environment in different clouds or sub-clouds that run a service, and by identified/potential security risks or threats.

Computer clouds are often classified into three types that are private clouds, public clouds, and hybrid clouds including both public and private clouds. Within these basic types, there is further variation as the clouds can be virtual private clouds or community clouds.

Specific security mechanisms may be needed to set up proper conditions for secure virtual and hybrid environments, so assuring a sufficient level of security for a specific purpose or service. Platform integrity (trust management) may be one concrete example of such specific security mechanisms, secure management of private keys and PKI integration for virtual appliances may be another. A third, more general, example is the security lifecycle management for services, which ranges from security policy (SP) design, SP enforcement and SP validation to security measures that have to be configured, supervised, and monitored in order to become aware of changes of a service's risk situation. A yet further example of security mechanisms could be presented as traffic inspected or filtered by firewalls of multiple administrative domains (clouds/sub clouds, e.g. as a service for cloud tenants).

SUMMARY

Various aspects of examples of the invention are set out in the claims.

According to a first example aspect of the present invention, there is provided a method comprising:

managing security of a cloud service in a cloud computer environment that runs the cloud service, the cloud computer environment comprising: a first computer cloud entity with first security capabilities and under security management coordinated by a first security management service point in compliance with predefined first security requirements; and a second computer cloud entity with second security capabilities and under security management coordinated by a second security management service point in compliance with predefined second security requirements;

the managing of the security of the cloud service in the cloud computer environment comprising:

establishing a trusted relationship between the first and second security management service points;

obtaining general security requirements for the cloud service; and defining for the first security management service point, based on the general security requirements for the cloud service, the first security capabilities and the first security requirements, a first security policy for the running of the cloud service by the first computer cloud entity.

The method may further comprise defining for the second security management service point, based on the general security requirements for the cloud service, the second security capabilities and the second security requirements, a second security policy for the running of the cloud service by the second computer cloud entity.

The defining of the first security policy for the first security management service point may comprise negotiating with the first security management service point. The negotiating with the first security management service point may comprise exchanging proposed security policy parameters or proposed sets of security policy parameters. The negotiating may comprise determining a best match between the security requirements of the cloud service and different alternative security policies available for the first security management service point. The determining of the best match may use a priority-driven algorithm. The negotiating may alternatively or additionally comprise reducing one or more security requirements of the cloud service. The reducing of one or more security requirements of the cloud service may comprise balancing conflicting security and network management needs, such as service quality (performance, latency, Quality of Service).

The first and second computer cloud entities may be of different types. One of the first and second computer cloud entities may be a telecommunication cloud such as an ETSI Network functions virtualization, NFV, cloud. The remaining of the first and second computer cloud entities may be an information technology cloud.

The cloud computing environment may comprise security functionalities desired by tenants such as firewalls and direct infrastructure provided access to security functionalities.

The defining of the second security policy for the second security management service point may comprise negotiating with the second security management service point.

The method may be performed by an automatic cloud management entity. The automatic cloud management entity may comprise the second security management service point.

The computer cloud entities may comprise computer clouds. The computer cloud entities may comprise computer sub-clouds. The computer cloud entities may comprise different portions of a computer cloud controlled by different administrative domains. The different portions may be virtualized and shareable resources.

An Administrative Domain, AD, may refer to a collection of systems and networks operated by a single organization or administrative authority. The components which make up the AD may inter-operate with a significant degree of mutual trust among them based on a stable trust relationship, while a transient, specific trust relationship may need to be established for inter-operating other domains.

The AD may be organized in a hierarchical manner. One AD may specify one or more sub-Ads. The sub-Ads may be defined with a delimited and non-overlapping scope of influence and associated resources.

The second security management service point may act as a master and the first security management service point may act as a slave in defining the first security policy for said cloud service. Concurrently, hierarchical relationship of the first and second security management service points may be different for security management of some other service run using the first and second cloud entities.

The obtaining of the security requirements for the cloud service may comprise receiving the security requirements from a security policy authority. The second security policy may be established by propagating the general security requirements to the first security management service point and causing the first security management service point to define the second security policy for the second security management service point.

One security management service point may be set as a master security management service point configured to control the defining of security policies for other security management service points of the cloud computer environment that runs the cloud service.

The security policies may be automatically defined for the security management service point of each computer cloud entity of the cloud computer environment that runs the cloud service.

The security management service points may use a security management domain level security policy mediator for domain level security management. The security management domain level security policy mediator may maintain security requirements and allocated capabilities for the security management domain. The security requirements and allocated capabilities may be defined by a given SLA.

The security management service points may use a security management service level security policy mediator for service level security management. The service level security policy mediator may maintain respective security policies for plural cloud services run in the security management domain.

The security management service points may be configured to establish the trusted relationship between their respective service level security policy mediators. The first security policy may be defined for the service level security policy mediator of the first security management service point. The second security policy may be defined for the service level security policy mediator of the second security management service point.

The first and second computer cloud entities may be of different types. The first and second computer cloud entities may reside in different regions. The regions may comprise any of towns, counties, federal states, countries or continents.

The method may comprise coordinating dynamic adapting the first security policy. The first security policy may be dynamically adapted in response to a change in the first security requirements. The first security policy may be dynamically adapted in response to a change in the general security requirements for the cloud service. Alternatively or additionally, the first security policy may be dynamically adapted in response to a change of the cloud service. Alternatively or additionally, the first security policy may be dynamically adapted in response to a security event or to a security incident.

The method may comprise detecting a need to change the first security policy and responsively negotiate again with the first security management service point.

The first and second security policies may be defined in a negotiation between parties that include the first and second security management service points.

Security management in a computer cloud entity may be performed by one or more security management entities. The security management service point may coordinate the operation of the one or more security management entities of the computer cloud entity. The one or more security management entities of the computer cloud entity may control operation of the computer cloud entity.

According to a second example aspect of the present invention, there is provided a method in a first security management service point comprising:

coordinating managing security of a first computer cloud entity with first security capabilities and under security management in compliance with predefined first security requirements;

establishing a trusted relationship with a second security management service point;

receiving an indication of general security requirements for a cloud service that is being run by plural computer cloud entities of respective different administrative domains;

defining based on the general security, the first security capabilities and the first security requirements, a first security policy; and controlling running of the cloud service by the first cloud entity according to the first security policy.

The defining of the first security policy may comprise negotiating with the second security management service point. The negotiating may comprise determining a best match between the security requirements of the cloud service and different alternative security policies available for the first security management service point. The determining of the best match may use a priority-driven algorithm. The negotiating may alternatively or additionally comprise reducing some security requirement of the cloud service (e.g. for performance).

The method may further comprise informing the second security management service point of security relevant changes in the first computer cloud entity. The security relevant changes may comprise any of: security incidents; hardware changes; performance changes; changes in the first capabilities; or changes in the first security requirements.

The method may further comprise negotiating again with the second security management service point to define the first security policy. The negotiating with the second security management service point may trigger re-defining the second security policy. The second security policy may be negotiated with the second security management service point.

According to a third example aspect of the present invention, there is provided a cloud service execution method, comprising:

assigning by a first administrative domain predefined first security requirements for a first computer cloud entity of the first administrative domain, the first computer cloud entity having first security capabilities;

assigning by a second administrative domain predefined second security requirements for a second computer cloud entity of the second administrative domain, the second computer cloud entity having second security capabilities;

coordinating security management in the first computer cloud entity in compliance with predefined first security requirements by a first security management service point;

coordinating security management in the second computer cloud entity in compliance with predefined second security requirements by the a second security management service point;

establish a trusted relationship between the first and second security management service points;

obtaining general security requirements for the cloud service; and defining for the first security management service point, based on the general security requirements for the cloud service, the first security capabilities and the first security requirements, a first security policy for the running of the cloud service by the first computer cloud entity.

According to a fourth example aspect of the present invention, there is provided a cloud service execution system, comprising:

an entity for managing security of a cloud service;

a first computer cloud entity of a first administrative domain, having first security capabilities and predefined first security requirements assigned by the first administrative domain;

a second computer cloud entity of a second administrative domain, having second security capabilities and predefined second security requirements assigned by the second administrative domain;

a first security management service point configured to coordinate security management in the first computer cloud entity in compliance with predefined first security requirements;

second security management service point configured to coordinate security management in the second computer cloud entity in compliance with predefined second security requirements;

the first and second security management service points being further configured to establish a trusted relationship;

a cloud management entity comprising at least one processor configured control the cloud management entity to perform:

obtaining general security requirements for the cloud service; and defining for the first security management service point, based on the general security requirements for the cloud service, the first security capabilities and the first security requirements, a first security policy for the running of the cloud service by the first computer cloud entity.

According to a fifth example aspect of the present invention, there is provided an apparatus comprising at least one processor configured to cause the apparatus to perform the method of any of the first example aspect, the second example aspect or the fourth example aspect.

According to a sixth example aspect of the present invention, there is provided a computer program comprising computer executable program code configured to cause, when executed, an apparatus to perform:

managing security of a cloud service in a cloud computer environment that runs the cloud service, the cloud computer environment comprising: a first computer cloud entity with first security capabilities and under security management coordinated by a first security management service point in compliance with predefined first security requirements; and a second computer cloud entity with second security capabilities and under security management coordinated by a second security management service point in compliance with predefined second security requirements;

the managing of the security of the cloud service in the cloud computer environment comprising:

establishing a trusted relationship between the first and second security management service points;

obtaining general security requirements for the cloud service; and defining for the first security management service point, based on the general security requirements for the cloud service, the first security capabilities and the first security requirements, a first security policy for the running of the cloud service by the first computer cloud entity.

According to a seventh example aspect of the present invention, there is provided a computer program comprising computer executable program code configured to cause, when executed, an apparatus to perform in a first security management service point:

coordinating managing security of a first computer cloud entity with first security capabilities and under security management in compliance with predefined first security requirements;

establishing a trusted relationship with a second security management service point;

receiving an indication of general security requirements for a cloud service that is being run by plural computer cloud entities of respective different administrative domains;

defining based on the general security, the first security capabilities and the first security requirements, a first security policy; and controlling running of the cloud service by the first cloud entity according to the first security policy.

According to an eighth example aspect of the present invention, there is provided a non-transitory computer readable memory medium comprising the computer program of any one of the preceding example aspects.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 6 shows a block diagram of an apparatus suited for implementing functionalities of an SMSP.

DETAILED DESCRIPTION OF THE DRAWINGS

An example embodiment of the present invention and its potential advantages are understood by referring to FIGS. 1 through 5 of the drawings. In this document, like reference signs denote like parts or steps.

Figure 1:
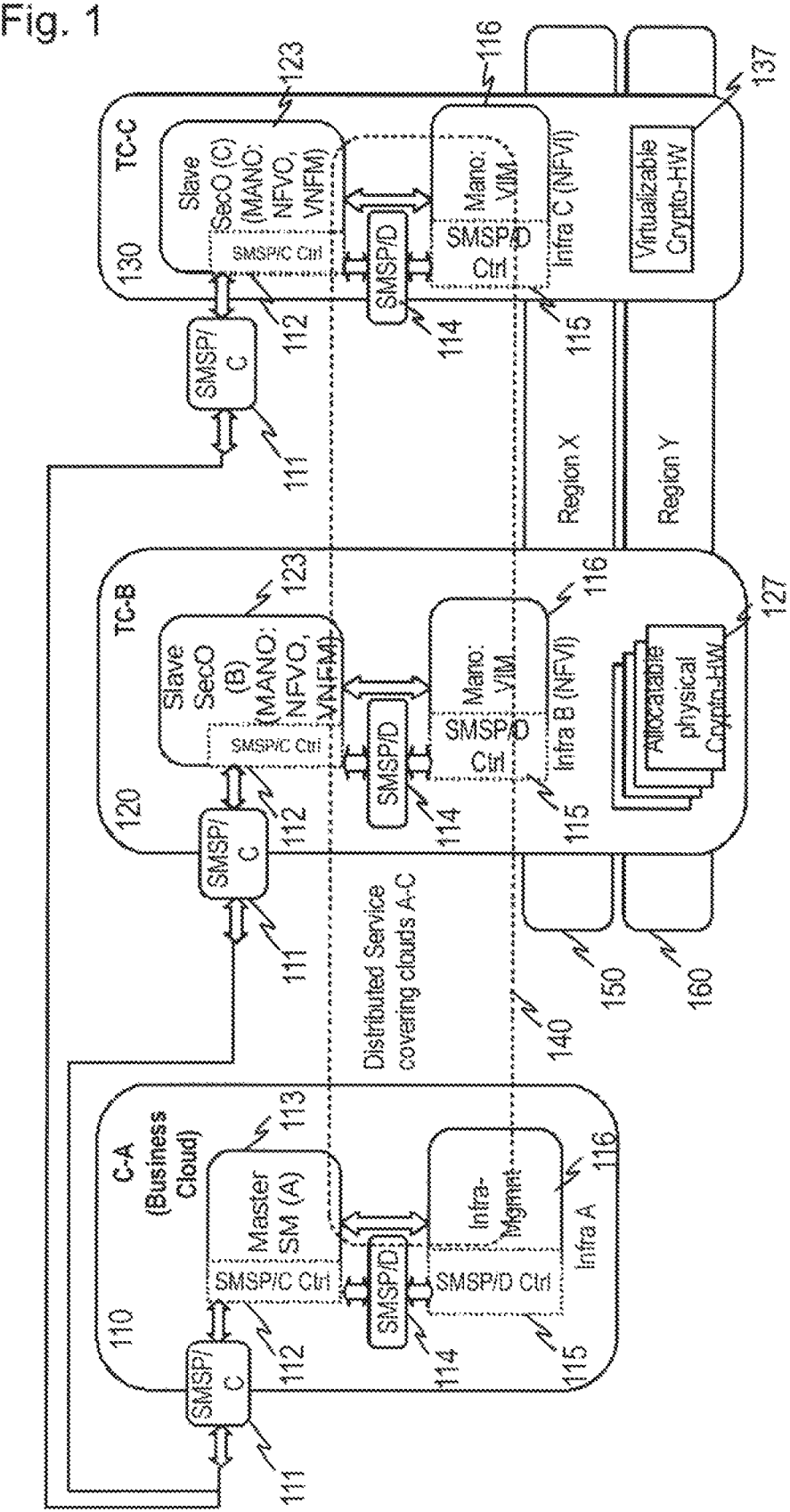
FIG. 1 shows an architectural drawing of a system of an example embodiment.

FIG. 1 shows an architectural drawing of a system of an example embodiment. FIG. 1 shows an Information Technology, IT, cloud 110 and two telecommunication clouds i.e. a first telecommunication cloud 120 and a second telecommunication cloud 130. The term cloud refers to a computer cloud or computing cloud unless otherwise qualified. The term domain refers to an administrative domain i.e. a pool of functionalities that is under control of a single organization. In case of sub-clouds or virtualized cloud services, the administrative domain refers to the functionalities that are visible to the service operator despite that some other party may manage the underlying equipment.

Each of the clouds comprises an inter-domain security management service point SMSP/C 111 and a domain security management service point SMSP/D 114 as respective reference points for inter-domain and intra-domain security management signaling, respectively. In FIG. 1, the security management is divided into external and internal (or exposable) reference points (SMSP/C 111 and SMSP/D 114) and respective control logics 112, 115 for each reference point. For intra-cloud security management, the domain security management service points control respective domain security management blocks 116. The domain security management blocks 116 are configured to control intra-domain security management.

The control logics interface with actual security management functionalities such as the security management block 113 of the cloud C_A 110 and the security management blocks 123 of the telecommunication clouds 120, 130. In this example, the Cloud C_A security management block 113 is denoted as a master while the other (inter-domain) security management blocks 123 are denoted as slaves. It should be appreciated that the master/slave role need not be permanent but can vary from one cloud service to another. Furthermore, within one service, one security management block may serve for a first period as a master and for another period as a slave. In this document, a security management entity acting as a master may be referred to as a master in short. Correspondingly, a security management entity acting as a master may be referred to as a slave. As such, the first and second telecommunication clouds 120, 130 may be similar, even identical, although they may act in similar or different roles. For example, instead of the information technology cloud 110, the first or second telecommunication cloud 120, 130 could act in master role for the same or some other cloud service. In sake of simplicity, FIG. 1 may be understood as a representation of the situation for one desired cloud service, referred to as "the cloud service". In FIG. 1, a dashed rectangle denotes a potential cloud service as a distributed service covering clouds A-C, 140.

Notice that FIG. 1 is intended to illustrate some details relating to security management in a cloud computing environment covering multiple computer clouds, here a mixed cloud system consisting of computer clouds of different types. Most of the equipment of computer clouds is not drawn, such as communication interfaces, firewalls, virtual private network servers, processors, memories, mass memories and databases. However, FIG. 1 shows in the first telecommunication cloud 120 an allocatable physical crypto-hardware 127 and in the second telecommunication cloud 130 a virtualizable crypto-hardware 137. These blocks represent different types of cryptographic functionalities available for distributed cloud services.

The clouds 110-130 drawn in FIG. 1 are functionally organized. However, the clouds 110-130 also have some regional scope i.e. they have users from potentially different regions such as countries or continents. Here, we assume that both first and second telecommunication clouds 120, 130 cover geographic regions X 150 and Y 160.

Figure 2:
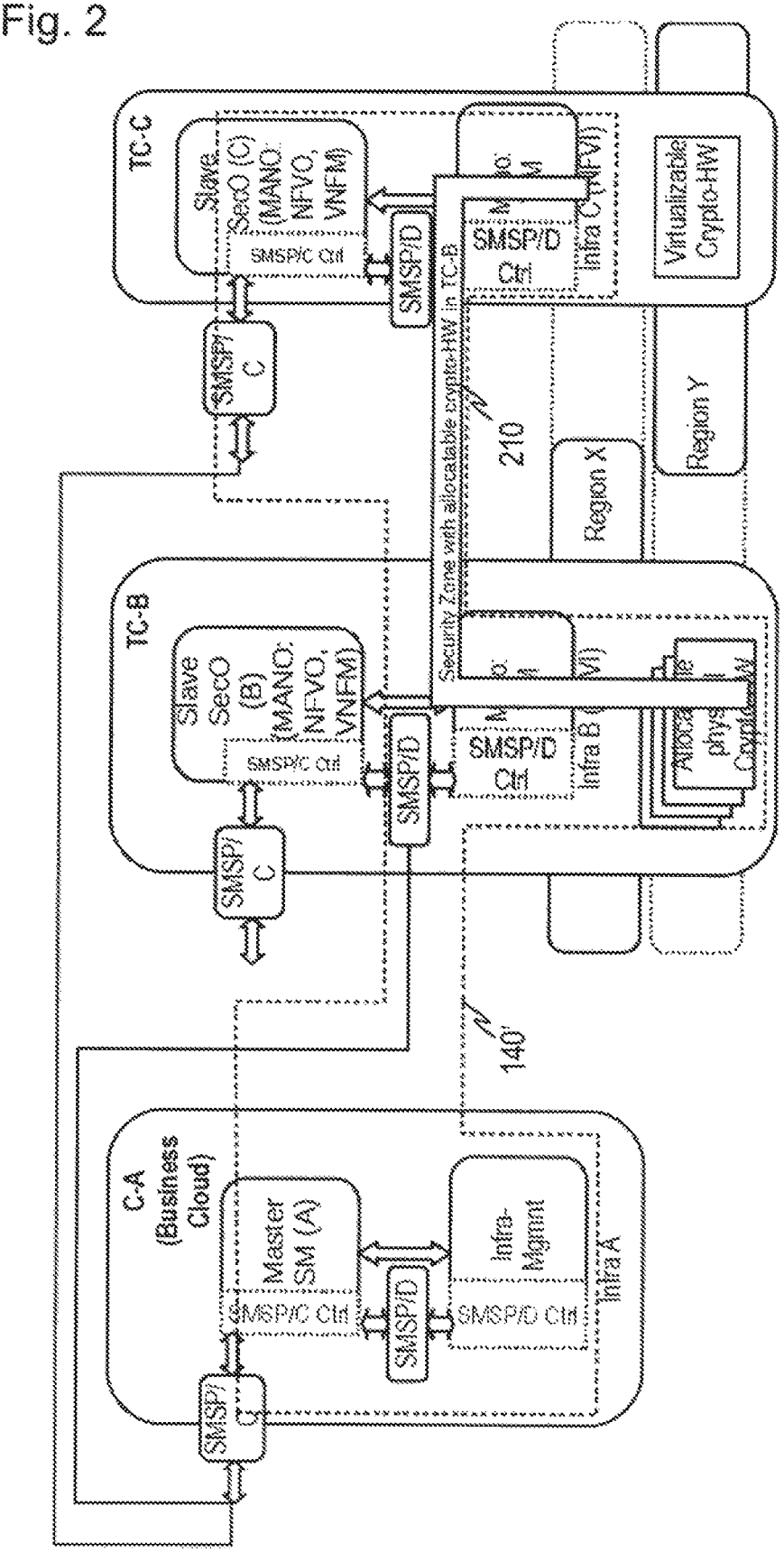
FIG. 2 shows an example of cloud service distribution over FIG. 1 clouds.

FIG. 2 shows an example of a specific cloud service distribution over the clouds of FIG. 1, after preceding negotiation steps. This example reflects a situation achieved through security management tasks of Security Management Service Points in which the distributed service is re-aligned to have a new coverage 140' based on intra-cloud negotiation between the related clouds. A security zone 210 shall be set-up to extend between parts of the first and second telecommunication clouds 120, 130. Following initial SPs and results of SMSP based SP negotiation, such a Security zone extends to the allocatable physical crypto-hardware 127 of the first telecommunication cloud 120 and to some infrastructure of the second telecommunication cloud 130, but not to the virtualized crypto-hardware 137 of the second telecommunication cloud 120. In FIG. 2 the Slave inter-domain Security Management Service Point or Security Orchestrator SecO is now bypassed while its role is according to previous negotiation taken over by the SMSP/D of the first telecommunication cloud as an example of an infrastructure provided access.

FIG. 2 further exemplifies that the regions covered by the different telecommunication clouds 110, 120 need not be entirely overlapping. In FIG. 2, the geographical coverage of the first and second telecommunication clouds is only slightly overlapping. For most of region X, the first telecommunication cloud 120 is needed for users to access the cloud service while for most of region Y, the second telecommunication cloud 130 is needed to access the cloud service.

Figure 3:
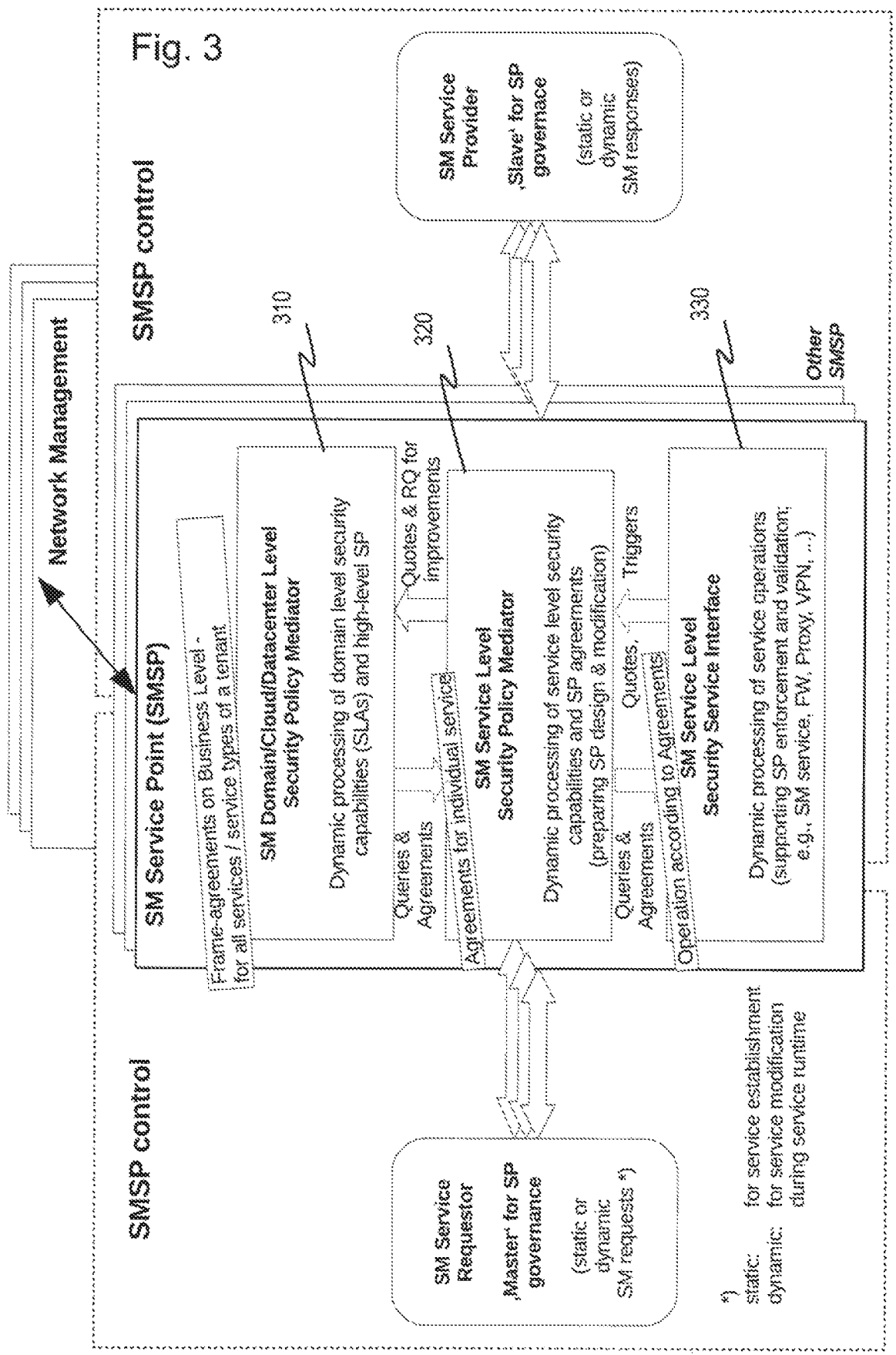
FIG. 3 shows a schematic drawing of an example embodiment in which operation of an security management service point is logically divided into three levels.

FIG. 3 shows a schematic drawing of an example embodiment in which operation of a security management service point is logically divided into three levels. Each security management service point may operate correspondingly and interact with respective network management that is responsible for the operation of the cloud in question.

A security management domain security policy mediator level 310 takes care of dynamic processing of domain-level security capabilities (e.g. service-level agreements, SLAs) and high-level security policy management. The domain level queries and negotiates agreements for individual services with a service level security policy mediator 320.

In an example embodiment, the domain security policy mediators level may take care of any of the following:
  initiating any communication for SM at cloud/domain level in order to, for example, agreeing on frame-conditions for inter-cloud/domain SM, e.g., in form of high-level security policies (technical) and SLAs (contractual). The SPs and SLAs may embrace the entire scope of SM for all intended services, respectively, service types.
  organizing propagation across the SMSP hierarchy when needed (e.g., a master SMSP requests to know the concrete capabilities relevant for SLA or SP negotiation, involving all connected slaves). Note: It may happen that SLA already exists as a prepared business offer or because they have been pre-negotiated in Network management NM context. However, we consider cases where (existing) SLAs need to be modified for security reasons, a (new) business model is created dynamically and also in conjunction with 'new' providers, or SLAs need to be adapted dynamically, if new security needs emerge. This process can be at least partially automated by the security management domain security policy mediator level 310.
  Automated SP/SLA negotiation (consensus can be found, by algorithm or by use of 'service related' templates and includes to take priority rankings into account), including, for example:
    conflict solution or mitigation (e.g., in case of contradicting or non-compliant SP/SLAs)
    dynamic (runtime) re-adjustments of SP/SLA (e.g., in case of service adaptations, new security reasons, or security incidents, which must be treated at domain/cloud level The service level security policy mediator 320 takes care of dynamic processing of service level security capabilities and security policy agreements, such as preparing security policy design and modification. The security policy mediator 320 further interacts with security management service requestors i.e. master security management service point(s) (e.g. different masters for different cloud services). Such requestors may present static and/or dynamic for service establishment/service modification during runtime, respectively. On the other hand, the same security policy mediator 320 further interacts with security management service providers i.e. slave security management service points. Such requestors may present static and/or dynamic for service establishment/service modification during runtime, respectively.

In an example embodiment, the service level security policy mediator 320 negotiates, based on existing frame agreements for SLA/(Top-Level) SP, security policies for individual telecommunication, cloud, or mixed services, provided and/or shared across involved domains. This includes (SP) conflict resolution or mitigation strategies and recovery mechanisms in case of security incidents. Results are service specific and depend on the capabilities or capacity of available SM mechanisms and services, which are (to be) provisioned for a specific (telecommunication or mixed) service type. They remain valid as long as the service is active or the SM conditions are re-adjusted. Considering SP based security life cycle management (as known in context with security orchestration) tasks on this level are closely related to SP design, re-design and modification for a telecommunication or mixed service. Assigned tasks may realize SP-preparing processes that are executed between several domains. These tasks need not be dominated by only one SPA (e.g., the tenant's SPA). Instead, SP/SLA agreements may be defined with a common consensus-finding process between at least two administrative domains. For example, such agreements may be bilateral (e.g., SM capabilities granted by different providers may be different) or they may have to be multi-lateral (e.g., in case a Security Zone SZ should be distributed across more than two infrastructure domains/datacenters, where the applied SP must be compatible in all domains). Examples (per service) aiming at consensus-finding include:
  (SP design) Establishment of SZ and SD:
    capabilities of platforms and isolation/segmentation mechanisms
    supporting SM services (including rules of SM & SM security)
    within one telecommunication cloud (interference with infrastructure provider/Virtualized Infrastructure Manager VIM)
    across Telecommunication Clouds, including IT cloud(s), etc.
  (SP design) Placement and configuration of Virtual Security Function VSF, HyperVisor HV based Security Function SF, and Physical Security Function PSF for cloud/domain crossing services, . . .
  (SP design) Physical Firewall FW in front of each HardWare HW platform, where Virtual Network Function VNF (or other Virtual Machine VM) are running on, . . .
  (SP design) . . . , any other SP which are relevant for an individual service, such as for monitoring, hardening, modification of services due to security events, adaptation of SP upon (business motivated) modification of a service, etc.
  (SLA, allocation of SM entities) assigned SM services, which can be used (including APIs, protocols, and interfaces) for SM of an individual service Assigned tasks include re-adjustments of SP/SLA at this level, even for running services. In some cases re-adjustments may not be possible based on current settings. In such situations a SM Service Level SP Mediator of one example embodiment initiates an iterative feedback loop 'bottom up', where the upper level SM Domain Level SP Mediator is asked to re-negotiate settings or to decide on further actions, in case any mitigation strategy fails. Such feedback loops are not only useful for technical (security) reasons, but may also be a matter of quality and cost-optimization:
  For instance, demands on shorter latency may arise if user devices and real-time application get more ambitious. Service changes (e.g., conditioned for real-time gaming) may require new network/cloud topologies (like temporary edge clouds), which come with specific security requirements.
  To give another example, let us assume, a specific SP/SLA setting for an individual process was calculated economically, only embracing security resources, which are expected for ordinary service usage and protection. If risks increase over time or even in an incident situation a mitigation strategy may demand for more resources (DoS defense), or immediate security patching, or migration of services to another platform, or usage of additional resources for incident analysis. Such 'expensive' (and possibly temporary) adjustments can technically be granted, but for cost reasons need to be decided on higher level.

Security reasons include challenges coming from user devices (malware), from container technology (allowing for more economic but less secure usage of resources as tenant isolation becomes weaker), new vulnerabilities, and so on.

A security management service level security service interface level 330 controls dynamic processing of service operations, such as supporting security policy enforcement and validation with, for example, security management service, firewalls, proxies, VPNs, etc.

At the lowest level of the three-staged SMSP architecture, the security management service level security service interface level 330 may be tasked, for example, to support for SP deployment, enforcement, and to provide validation, based on the SLAs and SP as agreed on higher layers and finally designed for a service.

The security management service level security service interface level 330 may be configured for providing secure and compatible provisioning and consuming of related SM services at the technical level, where authorization for service usage can be controlled by the SM Provider, assuring that agreed permissions for use are never exceeded. Besides the intrinsic SM services offered by the provider, other security functions can be made available at this level, e.g., Proxy/Firewall or VPN GateWay GW to isolate SM traffic between involved parties from any other network traffic.

For example, when offering interfaces to SM services, permission control (authorization) can be realized with common mechanisms for access control, such as via an implementation of Role-based access control RBAC or eXtensible Access Control Markup Language XACML based frameworks.

For example, a tenant may wish to configure a Hypervisor (HV) based firewall for protecting a number of VNF, being part of its service (i.e., running in the tenant domain). The infrastructure provider does not want to grant direct access to the HV, worried about misuse of a 'direct' HV interface. Via a suited intermediate service—such as represented by this operational SMSP layer—the infrastructure provider may ensure that only HV settings in a restricted manner (e.g., within granted IP address range or with limited impacts on performance or resource consumption) are allowed. Thus, such functionality can be conveniently decoupled of other HV configuration functions, which should (or must) not be exposed to any external party. Parameters for the access control mechanisms have been negotiated and determined through the agreements for a specific service or even for the entire domain.

Figure 4:
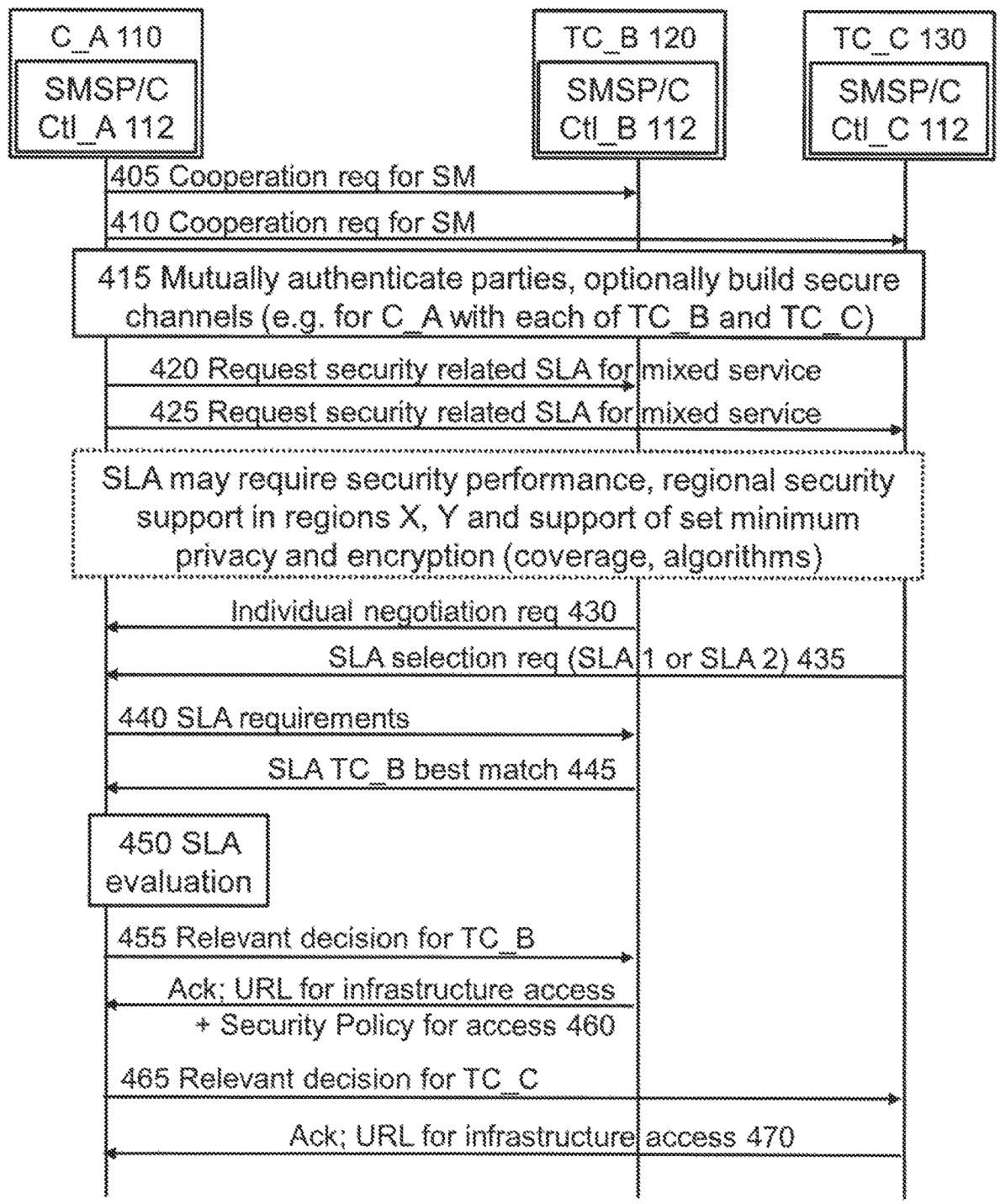
FIG. 4 shows a signaling graph illustrating a process of an example embodiment for initiating inter-cloud security management to establish or control a cloud service that spans over plural clouds.

FIG. 4 shows a signaling graph illustrating a process of an example embodiment for inter-cloud security management to establish or prepare control for security management of a cloud service that spans over plural clouds. FIG. 4 exemplifies how the service points of each cloud, or more particularly their control logics 112, may operate. In this case, the IT cloud 110 (or its SMSP) acts as a master and sends co-operation requests 405, 410 to the first and second telecommunication cloud SMSPs, respectively (here, these telecommunication clouds act as slaves). Mutual authentication is performed at least between the master and the slaves, 415, and secure channels are usually built between the master and the slaves. Notice that here it suffices that the master can securely communicate with each of the slaves i.e. there is no need for secure communication between the slaves. This exemplifies a tree-like hierarchy for security management.

After authentication, the master requests each slave with a respective request 420, 425 to provide a security related SLA for a mixed service that runs with IT and telecommunication clouds. The SLA may require given security performance, regional security support in regions X, Y and/or support of set minimum privacy and/or encryption (of desired coverage/algorithms). The slaves may respond in different ways two of which are shown here: the first telecommunication cloud SMSP replies with a request for individual negotiation in which various details of the SLA will be individually negotiated, 430. The second telecommunication cloud SMSP replies with a request for collective negotiation in which bunch of details or different groups of settings such as SLA1 and SLA2 are offered for selection, 430. In this case, neither of SLA1 and SLA2 offers requested direct access to cryptography hardware (even though the first telecommunication cloud has such hardware, but it cannot be availed due security requirements of the first telecommunication cloud or of some other cloud services that this cloud hosts). Instead, the second telecommunication cloud can provide high performance encryption in all regions according to SLA1.

Examples of things that may be defined by an SLA or security policy include:
- (SLA) Total number, capabilities, and availability of physical security appliances/security HW, which are disposable for telecommunication or mixed services;
- (SLA) High-level agreements on SM permissions, such as required for infrastructure access;
- (SP) Privacy and anonymity commitments, e.g., in context of anomaly and attack analysis;
- (SLA) High-level agreements on applicable methods for monitoring, hardening, and trust management;
- (SLA) . . . Interfaces, protocols, formats and semantics for the exchange of SM data;
- (SLA) . . . capabilities of SM services, as they can be offered and used (possibly location/region dependent);
- (SP) SP which must be met for all services, e.g., general agreements on integrity, confidentiality of data and authentication/authorization methods for accessing SM services;
- (SP) SP for tenant separation/segmentation, including usage of shared/reserved security HW, or firewalls, etc.
- (SLA) Capabilities for (and possible restrictions of) SM Life Cycle Management; for instance, SM capabilities may depend on country and the laws, by which a provider is governed; SM permissions may depend on the contracts, a provider has signed with other customers/tenants; last not least, SM capabilities may depend on the (technical) possibilities for access control to the supporting SM system.

The master SMSP negotiates with the first telecommunication cloud SMSP on conditions to cover regions X and Y in order to reach a mutually acceptable security policy SP for the first telecommunication cloud SMSP. For example, the master SMSP may send SLA requirements or cloud service security requirements to the first telecommunication cloud SMSP that can reply with an SLA offer 445 as a best match with the capabilities/requirements of the first telecommunication cloud 120 and the cloud service requirements. This best match offers direct access to infra and allocatable crypto-hardware, but less performant encryption services in region Y while being best for X. The determining of the best match may use a priority-driven selection in which conflicting needs of security management and possibly also of network management are assigned with different weights for balanced combination. Moreover, some needs may be defined as critical so that non-compliance is not permitted (e.g. sufficient access protection or database securing).

Armed with the information of available options best suited for the security requirements of the cloud service, the master performs an SLA evaluation in which it decides which slaves to use and how. Here, we assume that the master decides to use the first telecommunication cloud 120 for region X and database protection, and direct access to infrastructure, and the second telecommunication cloud 130 for region Y, both of these clouds with their best encryption services (that need not be same). Then the master informs 455 the first telecommunication cloud SMSP of the part of the decision or evaluation that is relevant for that party and in response receives 460 an acknowledgement and particulars for use of the first telecommunication cloud 120 for running the cloud service. The particulars comprise, for example, a network address such as a universal resource locator URL to the infrastructure offered by the first telecommunication cloud 120 and a security policy or SLA applied in performing the cloud service.

The master further informs 465 the second telecommunication cloud 130 of the relevant decision for that party. As the second telecommunication cloud provided two alternatives, SLA1 and SLA2, the second telecommunication cloud 130 need not inform the master of its security policy but instead it can simply acknowledge the instructions 470. In this example embodiment, it is assumed that a link to the infrastructure of the second telecommunication cloud 130 is already known and can be further used; all security management traffic of this example is and will be handled by a SecO in TC-C.

Figure 5:
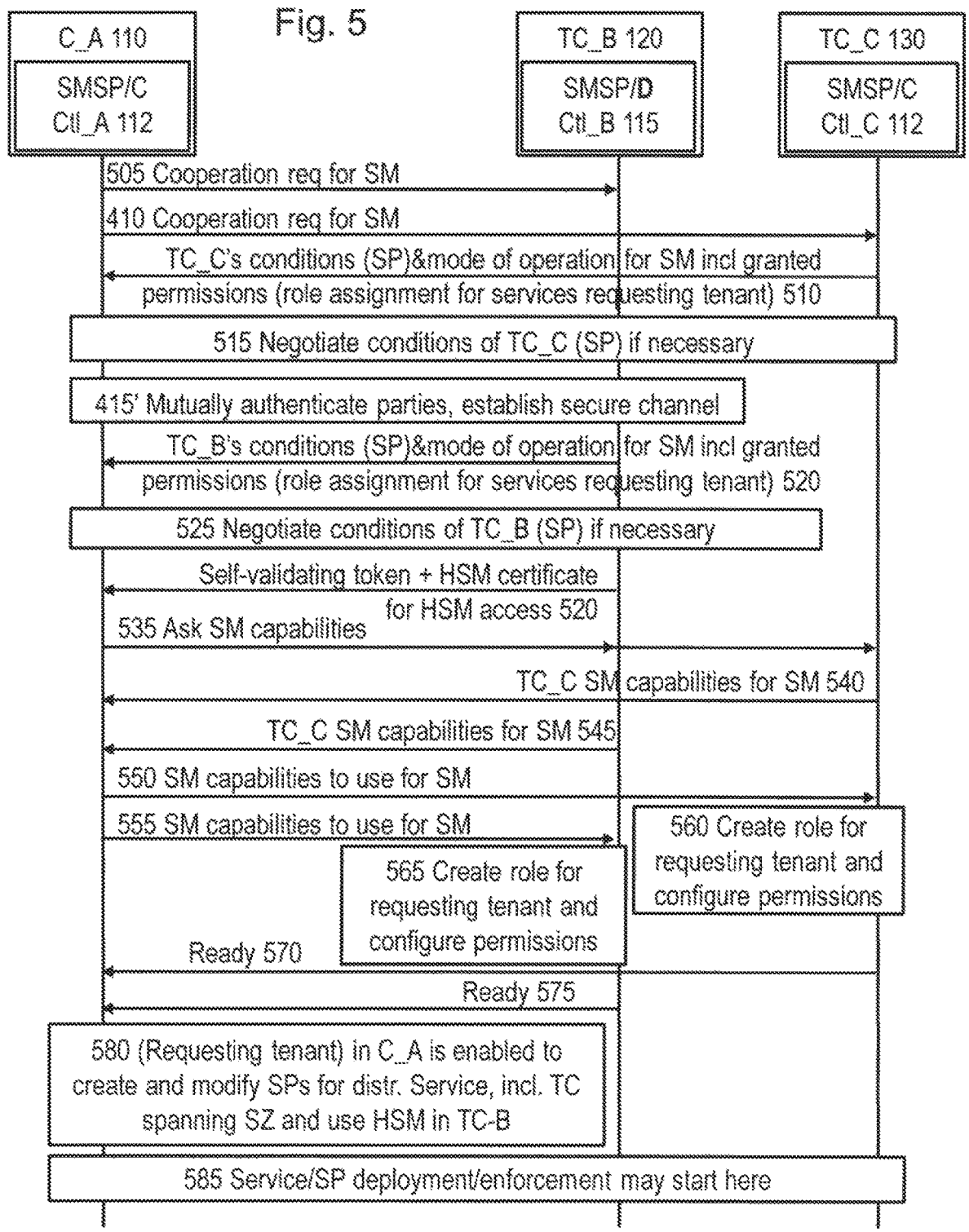
FIG. 5 shows a signaling graph illustrating a process of an example embodiment for inter-cloud security management to manage the cloud service set up.

FIG. 5 shows a signaling graph illustrating a process of an example embodiment for inter-cloud security management to manage the cloud service set up. In this case, the first telecommunication cloud 120 is referenced through its intra-domain security management service point control logics 115. Now, when the master sends a cooperation request for security management to the first telecommunication cloud 120, the request should make use of access credentials such as a hardware security module HSM access code or signed/encrypted messages. While the SMSP/D reference point may be particularly intended for intra-domain use, it may clear the right to directly interface with other domains e.g. by a suitable query from the SMSP/C to gain permission for providing access to the infrastructure of the first telecommunication cloud 120. It is also possible to transition from referencing through an inter-domain SMSP to using an intra-domain SMSP so that the permission to access the intra-domain SMSP associated credentials are readily granted by the SMSP/D. For example, it in an example the SMSP/C or SecO that is only involved in first negotiation steps will be subsequently bypassed. The master i.e. SMSP of the IT cloud 110 next sends a cooperation request to the second telecommunication cloud 130, 410 as in FIG. 4. The SMSP/D of the second telecommunication cloud 130 responds with its conditions (security policy) and mode of operation indication for the security management including granted permissions such as a role assignment for tenant services, 510. The conditions of the second telecommunication cloud 130 will then be negotiated 515 if necessary.

The master then performs the mutual authentication 415' with the first telecommunication cloud 120 as in FIG. 4 except that the intra-cloud SMSP is now used for referencing or accessing the cloud for security management. Then the master receives from the first telecommunication cloud 120 its conditions (security policy) and mode of operation indication for the security management including granted permissions such as a role assignment for tenant services, 520 and negotiates 525 upon the conditions if necessary as in step 515 with the second telecommunication cloud 130.

The master receives an extra, self-validating token from the first cloud 120, such as a private key and a short-time certificate, and an HSM certificate for HSM access. These data may be configured to sign and/or encrypt all messages to/from the HSM of the first SMSP/D of the first telecommunication network 120 and subject to be periodically renewed in order to maintain a live short-time certificate.

The master then receives requested capability reports from the second and first telecommunication networks 130, 120, including e.g. hypervisors, sensors monitoring, firewall type, VPN type, building blocks for encryption, security performance, such as latency, methods, etc., with respective message 540, 545. The master then determines and instructs with respective messages 550, 555 the second and the first telecommunication networks 130, 120, as to which capabilities to they should use for the security management (and also optionally how). The second and first telecommunication networks 130, 120 then respectively create 560, 565 a role for a requesting tenant (security orchestrator) and configure associated permissions and thereafter send a ready signal 570, 575. The master is now enabled 585 to create and modify SPs for the cloud service for distributed running by the slaves, including security zone spanning over telecommunication clouds 120, 130 and use of HSM in the first telecommunication cloud 120.

In the foregoing, it was described particularly how resources and necessary security policies could be negotiated to run a cross-cloud service. Besides such negotiation, it should be appreciated that the slave SMSPs allow and control SM execution through previously negotiated control elements and methods. For example, they may offer a set of definable SM services and associated, tailored access control, which are specific for the instantiated service, respectively, tenant, but are supervised by the (cloud/infra-structure) provider. This property may ultimately enable SM cooperation between independent administrative domains which would otherwise hardly be accepted between two stakeholders that may have business conflicting interests.

The SMSP slaves may further enable trust relationships with SM entities (such as, e.g., VIM in ETSI NFV, or between involved SecOs and via other SMSP—with other SM entities. Moreover, security management roles may be hierarchically delegated. For example, an SM IT-Cloud master may connect to SecO-TC1 (the SecO of the first telecommunication cloud), asking to handle all telecommunications related security management. The SecO-TC1 may connect to two subordinated SecO-TC2 and SecO-TC3 . . . and so on.

As briefly mentioned in the foregoing with reference to FIG. 3, by using layered approach of SMSP (master & slave) enables triggers for SP changes to be handled top down (e.g., due to service changes) as well as bottom up (e.g., due to security relevant events, like incidents reported from monitoring or also caused by performance needs, requiring scaling of a firewall or encryption unit, for instance). This capability may enable computationally efficient dynamic and flexible cross domain security management.

FIG. 6 shows a block diagram of an apparatus 600 (e.g. server computer) suited for implementing functionalities of an SMSP, for example. The apparatus comprises an input/output 610 for data exchange, a processor 620, a user interface for local control (e.g. for maintenance), a memory 640 comprising program code 642, and a database 650 (e.g., for storing SLA and/or SP information). The processor 620 is configured to control operation of the apparatus 600 according to the program code 642.

Without in any way limiting the scope, interpretation, or application of the claims appearing below, a technical effect of one or more of the example embodiments disclosed herein is that holistic and automated security management may be enable across plural administrative domains. Another technical effect of one or more of the example embodiments disclosed herein is that security management functions may be enabled across administrative domains. Another technical effect of one or more of the example embodiments disclosed herein is that by defining the first security policy for the first security management service point based on the general and first security requirements and capabilities and further based on the general security requirements, the security management may be adapted for local requirements while taking into account the cloud service requirements. Another technical effect of one or more of the example embodiments disclosed herein is that security management of a cloud service may be arranged with distributed responsibility so that the security management service points may negotiate their own security policies duly accounting for cloud service needs and local security requirements without excessively disclosing their status information to other domains. Another technical effect of one or more of the example embodiments disclosed herein is that by defining a security policy using one security management service point to a subsequent security management service point, the security management may be propagated over a plurality of security management service points. Another technical effect of one or more of the example embodiments disclosed herein is that by dynamically changing the first security policy, the first computer cloud entity may be dynamically adapted by its security management to a change in the security needs for the cloud service, changes in the cloud service or changes in security environment such changed security threats and/or security incidents. Correspondingly, other cloud entities may be dynamically adapted by their security policies. The entire cloud computer environment may be reconfigured by security for dynamic adapting to security needs. The different security management service points may mutually adapt the security policy of a computer cloud entity that contributes to running the cloud service.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    at least one processing core,
    at least one memory including computer program code, the at least one memory and the computer program code being configured to, with the at least one processing core, cause the apparatus at least to:
    manage a first computer cloud entity with first security capabilities and under security management coordinated by a first security management service point in compliance with predefined first security requirements;
    manage a second computer cloud entity with second security capabilities and under security management coordinated by a second security management service point in compliance with predefined second security requirements;
    establish a trusted relationship between the first and second security management service points; obtain general security requirements for a cloud service;
    define for the first security management service point, based on the general security requirements for the cloud service, the first security capabilities and the first security requirements, a first security policy, and
    define, for the second security management service, based on the second security capabilities and second security requirements associated with the predefined second security requirements, a second security policy for running of the cloud service by the first computer cloud entity and the second computer cloud entity.

2. The apparatus claim 1, wherein the defining of the first security policy for the first security management service point further comprises a negotiating with the first security management service point.

3. The apparatus of claim 2, wherein the negotiating with the first security management service point comprises exchanging proposed security policy parameters or proposed sets of security policy parameters.

4. The apparatus of claim 2, wherein the negotiating comprises determining a best match between security requirements of the cloud service and different alternative security policies available for the first security management service point.

5. The apparatus of claim 1, wherein the first and second computer cloud entities are of different types.

6. The apparatus of claim 1, wherein the cloud service comprises security functionalities desired by tenants and direct infrastructure provided access to security functionalities.

7. The apparatus of claim 1, wherein the apparatus is an automatic cloud management entity.

8. The apparatus of claim 7, wherein the automatic cloud management entity comprises the second security management service point.

9. The apparatus of claim 1, wherein any of the first and second computer cloud entities comprise any of computer clouds and computer sub-clouds.

10. The apparatus of claim 1, wherein any of the first and second computer cloud entities comprise different portions of a computer cloud controlled by different administrative domains.

11. The apparatus of claim 10, wherein the different portions comprise virtualized and shareable resources.

12. The apparatus of claim 1, wherein the second security management service point acts as a master and the first security management service point acts as a slave in defining the first security policy for said cloud service.

13. The apparatus of claim 1, wherein hierarchical relationship of the first and second security management service points can be concurrently different for security management of some other service run using the first and second cloud entities.

14. The apparatus of claim 1, wherein the obtaining of the security requirements for the cloud service further comprises: receive the security requirements from a security policy authority.

15. The apparatus of claim 14, wherein the second security policy is established by propagating the general security requirements to the first security management service point and causing the first security management service point to define the second security policy for the second security management service point.

16. The apparatus of claim 1, wherein one security management service point is set as a master security management service point configured to control the defining of security policies for other security management service points of the cloud computer environment that runs the cloud service.

17. The apparatus of claim 1, wherein security policies are automatically defined for the security management service point of each computer cloud entity of the cloud computer environment that runs the cloud service.

18. A cloud service execution method, comprising:
assigning by a first administrative domain predefined first security requirements for a first computer cloud entity of the first administrative domain, the first computer cloud entity having first security capabilities;
assigning by a second administrative domain predefined second security requirements for a second computer cloud entity of the second administrative domain, the second computer cloud entity having second security capabilities;
coordinating security management in the first computer cloud entity in compliance with predefined first security requirements by a first security management service point;
coordinating security management in the second computer cloud entity in compliance with predefined second security requirements by the a second security management service point;
establishing a trusted relationship between the first and second security management service points;
obtaining general security requirements for the cloud service; and
defining for the first security management service point, based on the general security requirements for the cloud service, the first security capabilities and the first security requirements, a first security policy and defining, for the second security management service, based on the second security capabilities and second security requirements associated with the predefined second security requirements, a second security policy for running of the cloud service by the first computer cloud entity and the second computer cloud entity.

19. A cloud service execution system, comprising:
a first computer cloud entity of a first administrative domain, having first security capabilities and predefined first security requirements assigned by the first administrative domain;
a second computer cloud entity of a second administrative domain, having second security capabilities and predefined second security requirements assigned by the second administrative domain;
a first security management service point configured to coordinate security management in the first computer cloud entity in compliance with predefined first security requirements;
second security management service point configured to coordinate security management in the second computer cloud entity in compliance with predefined second security requirements; the first and second security management service points being further configured to establish a trusted relationship;
a cloud management entity comprising at least one processor configured control the cloud management entity to perform:
obtaining general security requirements for the cloud service; and define for the first security management service point, based on the general security requirements for the cloud service, the first security capabilities and the first security requirements, a first security policy and defining, for the second security management service, based on the second security capabilities and second security requirements associated with the predefined second security requirements, a second security policy for running of the cloud service by the first computer cloud entity and the second computer cloud entity.

* * * * *